United States Patent [19]

Krishnan et al.

[11] 4,180,153

[45] Dec. 25, 1979

[54] HIGH SPEED BATCH COUNTING APPARATUS

[75] Inventors: Ravi C. Krishnan, Bethesda; Charles M. Blackburn, District Heights, both of Md.

[73] Assignee: Sigma Systems, Inc., Capitol Heights, Md.

[21] Appl. No.: 900,729

[22] Filed: Apr. 27, 1978

[51] Int. Cl.$^2$ .............................................. B65G 47/28

[52] U.S. Cl. .................................. 198/425; 198/460; 198/493; 198/502; 198/954; 221/7

[58] Field of Search ................. 221/2, 7; 53/500, 501; 198/391, 425, 459, 460, 493, 502, 954

[56] References Cited

U.S. PATENT DOCUMENTS

| | | | |
|---|---|---|---|
| 3,618,819 | 11/1971 | Blackburn et al. | 53/500 |
| 3,746,211 | 7/1973 | Burgess, Jr. | 221/7 |
| 3,837,139 | 9/1974 | Roseberg | 53/501 |

FOREIGN PATENT DOCUMENTS

| | | | |
|---|---|---|---|
| 778043 | 7/1957 | United Kingdom | 198/493 |

*Primary Examiner*—Jeffrey V. Nase
*Attorney, Agent, or Firm*—Laurence R. Brown

[57] ABSTRACT

A continuously moving stream of pieces taken from a storage bin is separated into precisely counted batches, for bagging, or the like. The flow speed of the pieces is optimized and substantially constant at a highest possible speed of flow higher than the batcher operating speeds will handle. Thereby this invention provides an alternative to eliminate the need for reducing flow speed because batchers require relatively long operating times and to avoid the disadvantage that reduction of the flow line speed when handling many successive batch pieces which is a slow process because of the high inherent inertia to changes of speed. In order to increase the flow speeds to higher effective batch handling rates, some of the pieces are removed from a high speed stream flow to create gaps in the flow stream between batches, thereby permitting optimized time interfacing with the necessary batching operations which thereby may proceed at a slower rate than the average piece by piece flow rate. Also, this technique assures that there is always an exact count since the batcher, which is time limited at the critical system point, has adequate time to perform its function in the gap period without losing or gaining a piece from the stream. Also, handling and storage of pieces removed from the stream is expedited by removing the pieces from the stream directly back into the storage bin feeding the stream, and simplified control systems responsive to gap detection techniques can be used.

17 Claims, 4 Drawing Figures

HIGH SPEED BATCH COUNTING APPARATUS

This invention relates to material handling techniques and more particularly it relates to batching of a precise number of pieces for bagging, and the like.

BACKGROUND OF THE INVENTION

This invention is an improvement over such batching equipment as set forth in U.S. Pat. No. 3,618,819 issued to Charles M. Blackburn and John L. Ditman on Nov. 9, 1971 for Electronic Counting Apparatus. That entire patent is incorporated herein as a part of the disclosure for the purpose of background, and to eliminate attention to details that relate to peripheral and system equipment in a way obscuring the nature and spirit of this invention. The known prior art is represented by this patent and its cited references.

Some of the problems unresolved in prior art batch counters in general include (1) limitations of operating speed, (2) ineffective precision and accuracy of the count, (3) the accumulation, storage and handling of rejected pieces, and (4) non-continuous flow of pieces that reduces batching speeds.

The most difficult problem to resolve includes a combination of these deficiencies, namely the attainment of the highest reliable operating speed with the lowest maintenance cost. Thus, high speed attained when batch counts are not precise is not acceptable, nor is high speed attained at the expense of complex auxiliary equipment and/or auxiliary operations requiring interspersed manual attention.

Most of the prior art batching speed limitations resided in heavy mechanical equipment with considerable inertia necessitated to handle many pieces at a time or complex motion patterns such as involved in processing the batches for bagging, etc. Thus, the prior art systems have been limited to average processing speeds of pieces being counted far less than the speed at which the pieces may be presented reliably for counting or individual handling.

OBJECTS OF THE INVENTION

Accordingly, it is a general object of this invention to provide improved higher speed batch counting techniques.

A more specific object of the invention is to achieve more reliable counting of batches while the batching speed is increased.

Another object of the invention is to correct one or more of the prior art deficiencies such as hereinbefore stated.

Yet another object of the invention is to produce a completely automated piece batch counting system continuously operable without interruption.

BRIEF DESCRIPTION OF THE INVENTION

Pieces to be counted are fed from a storage bin along a conveyor line in a continuous stream of pieces at a speed faster than that at which the batching mechanism will reliably operate. As the pieces are counted out for batching, at least one piece is removed from the stream (directly back into the storage bin) to provide a gap and therefore a change in average presentation rate of the pieces without changing either the piece flow speed or the average repetition rate of pieces over the remainder of the batch count. Thereby the batching speed is increased, and a simplified mechanism produces a single flow speed at a higher piece speed than before feasible. When batching equipment can be operated by sensing the gap between pieces, simpler batching control circuitry can be used.

THE DRAWING

Other features, advantages and objectives of the invention will be found throughout the following more detailed specification with reference to the accompanying drawing, wherein.

DETAILED DESCRIPTION OF THE INVENTION

Figure 1:
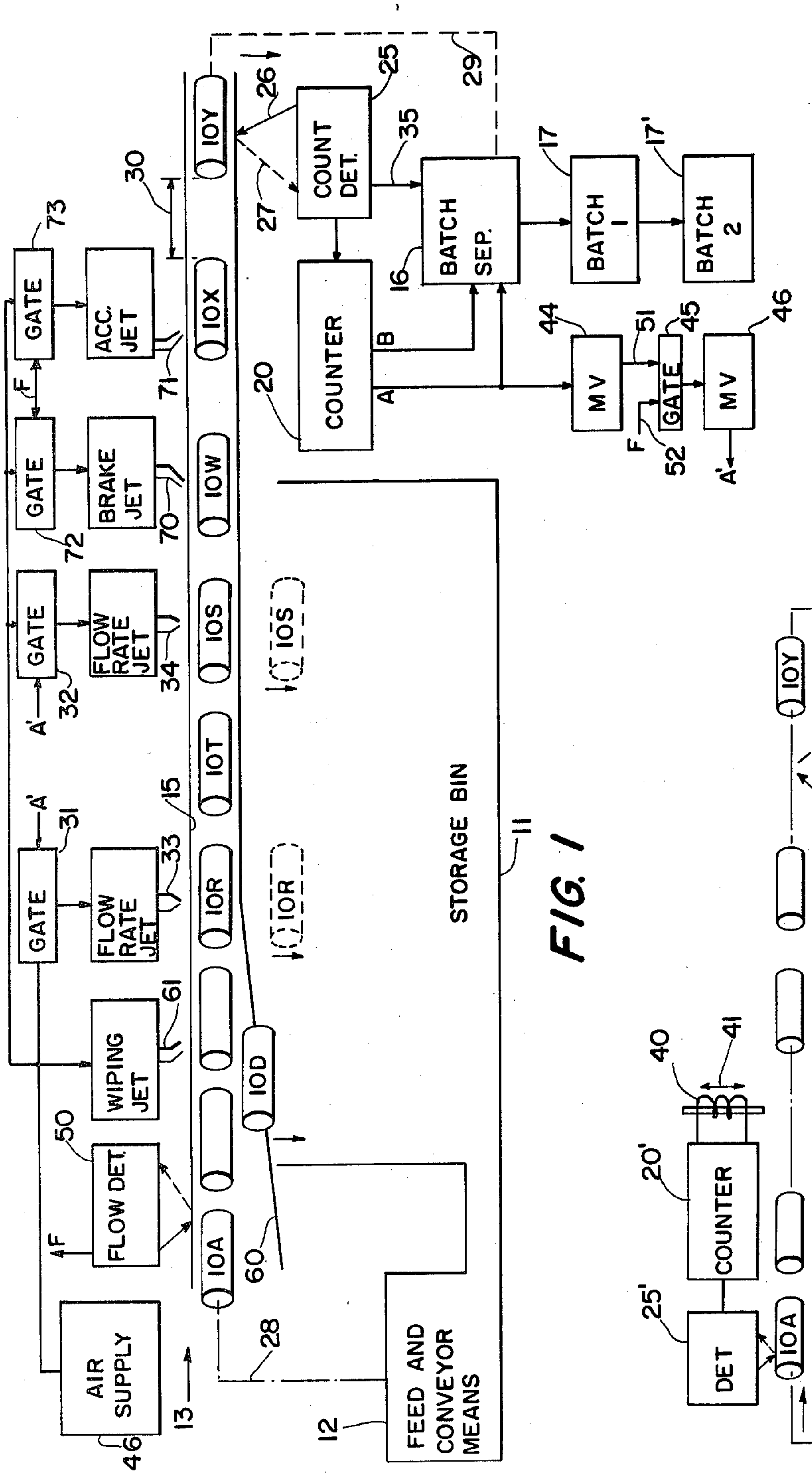
FIG. 1 is a schematic flow and block diagram of a batching system incorporating the invention.

There is set forth in FIG. 1 a system having a plurality of pieces 10, etc., to be counted and batched fed from a storage bin 11 by feed and conveyor means 12 to flow continuously at a single substantially constant speed in the direction of arrow 13 with the stream of pieces flowing along a line defined by a trough 15 or other confined pathway terminating in a batch separator 16 that may be of the type conventional in the prior art to produce batches 17, etc., of parts accumulated in conveyor bins, bags, boxes or the like. The feed or conveyor means 12 is preferably a centrifugal or vibrator conveying feeder of the type well known in the art. While the flow speed may be controlled for variations in the handling accuracy of pieces of different weight, shape, etc., one advantage of this system is that a variable speed control and speed change control equipment is not necessary for one particular kind of piece being handled in a batcher of known speed capabilities.

The batch separator operates on a batch count B from counter 20 which detects and counts out a preset batch number of pieces from the stream and directs batch separator 16 to segregate that batch. The counter is preset automatically and then counts out a further batch. The counter has also an anticipation count output A. Thus, if the batch count is 24, the anticipation count could be 21, 23 or the like, to indicate that the end of the batch is approaching.

The anticipation signal A may be used to set the separator 16 into motion to gain overall processing speed. This is possible since flow of pieces along trough 15 can proceed at a faster piece by piece presentation rate than the cyclic operation capability of the batch separator to intersperse between two pieces and complete its separation function and return for receiving the next batch.

The count detector 25 preferably has a beam 26 and reflected or interrupted sensing beam 27 that signals each piece passing along the stream. It is placed at a point synchronously located on the flow path 28-15-29 to provide the proper count timing for batching means such as separator 16. In this case the count detector 25 is located at a position in the stream of pieces where the gap spacing 30 between the pieces has been increased in order to reduce criticality of timing and count in the batch separator 16 which need function between two adjacent pieces 10 in the stream to separate two adjacent batches 17, 17'.

The result attained by this step is both to increase processing speed and to increase count reliability in the fashion explained now. If the batch separator must insert a member or direct the flow path in a conventional way with pieces closely following each other the synchronous timing of the pieces must be very accurately controlled to prevent acting too early or too late with a resulting mis-count. The electronic counter 20 has a faster speed capability than the batcher 16 which must move a mechanism of some sort and thus the mis-count is not because of the counting operation. Separation of the gap spacing 30 therefore eliminates such inaccuracies and permits more reliable counting of batches.

Also, this expedient increases the average overall processing speed with the disclosed system. Thus, consider that the piece flow speed overall might be reduced to permit accurate batching as an obvious alternative corrective feature, where the price paid is lower operation speed. This is not the preferred alternative. A temporary change of flow speed made at the time of the batching function could also be made to slow down the stream flow speed only when necessary. However, if this is done the inertia of the conveyor system is large and can't be switched quickly. Thus, the low versus high speed duty cycle becomes large particularly for small counts such as a dozen. With the present invention however, the flow speed of the pieces can be kept at an optimum highest reliable flow speed level and the inter-piece gaps 30 give a reliability factor. Particular advantage is gained with a vibratory type conveyor 12–15 where pieces tend to accumulate in sequence and push each other along a flow stream after passing along the flow path a ways, and thus are difficult to separate into batches without count errors at even lower flow speeds.

To provide even greater flow speed capabilities, flow control means is disposed along the flow trough line 15 serving to remove separated ones of the pieces 10R and 10S interspersed by at least one remaining piece 10T, thereby to create an end-of-batch larger gap which permits batch handling means to operate more reliably at the critical end of the batch separation instant.

In the embodiment of FIG. 1, thus by using the anticipatory count A (modified to A') in gating via gates 31, 32 and corresponding air jets 33, 34, pieces 10R and 10S are removed from the flow line. This is preferably done by locating the flow stream trough 15 so that jets 33 and 34 can blow the pieces off the trough directly into the storage bin 11 to avoid further handling or storage of the pieces, as indicated by the phantom pieces 10R and 10S and associated arrows.

The anticipatory count and location of the jets 33, 34 along the flow stream are timed and synchronized to permit the additional gap spacing to reach the batch separator at the proper critical instant. Where two gaps are provided by means of removing two pieces 10R and 10S a greater effect on average flow rate of pieces contrast is effected without changing the optimum flow speed of the individual pieces. Also, the spacing on either side of piece 10T will permit a local direction of subsidiary operations such as preparation for batching and restoration for a new batch cycle, as may be directed for example by detector 25 to batcher 16 via lead 35.

Figure 4:
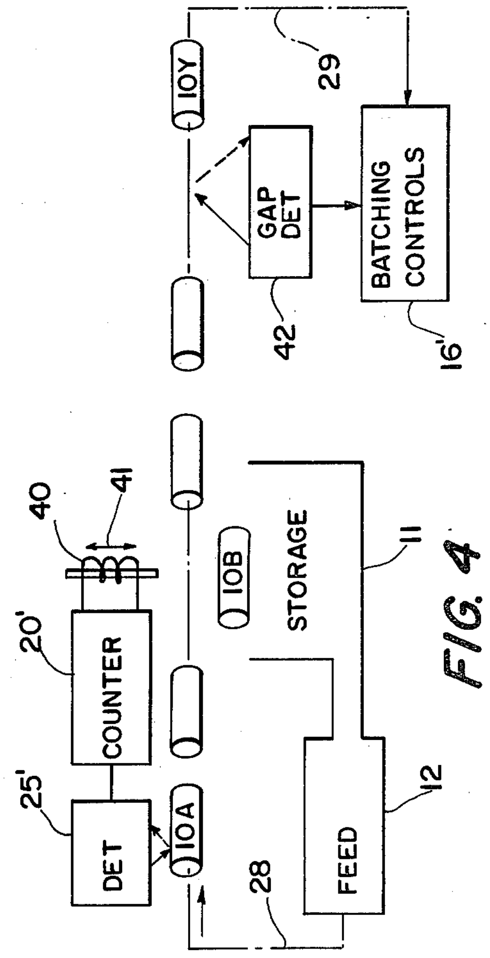

This mode of operation also leads to a simplified operational system diagrammed in FIG. 4. Thus, the detector 25' and counter 20' serve the same equivalent overall functions in a different manner by directing solenoid 40 or equivalent means to remove the end of batch count piece 10B from the flow path 28–29 by reciprocation of a plunger as indicated by arrow 41. Then a gap detector 42 placed along the flow path 28–29 can synchronously direct the batching control means 16' in its operation. It is seen that this operational mode results in a very simple control system which also for reasons aforesaid tends to correct prior art system deficiencies in reliability and speed.

In order to appropriately time and synchronize the jets 33 and 34 to operate when pieces 10, etc., are in place, the control circuits comprising multivibrator 44 gate 45 and multivibrator 46 develop the modified anticipation signal A'. Air is supplied to all the jets 33, 34 etc., by a conventional air supply 46 and gates 31, 32, etc. may be conventional solenoid operated valves for example. Appropriate amplifiers and electric power supply connections are eliminated since they are easily supplied by those skilled in the art to match a variety of requirements of solenoid valves and the like.

This control circuitry in general stretches a count anticipation signal A in multivibrator 44 over a period substantially the same as the time between presentation of two separate pieces 10 along the flow path adjacent flow detector 50, which provides flow rate signal pulses F whenever a gap appears between two pieces, for example. Thus, the multivibrator vibrator 44 output pulse on lead 51 will overlap one such flow pulse F at least 52, and thus trigger multivibrator 46 to produce the anticipation pulse A' of such length to operate gates 31, 32 and jets 33, 34 just long enough in the presence of pieces (indicated by F pulse synchronization) to reliably blow them off groove 15 into the storage bin 11 as indicated by the phantom pieces 10R, 10S.

Sometimes while feeding pieces into the stream along the ramp 60-15, there can be a double feed indicated by piece 10D, and if this were carried along the flow stream it would cause a mis-count. Thus, the trough 15 is so structured to permit a wiper such as the jet 61 to blow over the normal flow stream path with the function of dislodging the duplicate piece 10D and returning it to storage bin 11.

As previously discussed, it is desirable to introduce a spacing gap 30 between pieces in the stream 29 as they approach the batch separator 16. This is accomplished by braking jet 70, acceleration jet 71 and corresponding gates 72, 73. At this point pieces are being presented substantially in contact at a flow rate detected by flow detector 50 and designated by flow control pulses F. These then with appropriate synchronizing spacing of jets 70 and 71 and such delays as desirable therewith will operate gates 72, 73 in a pulsing mode synchronous with presentation of pieces 10W and 10X. The braking jet 70 serves to hold the piece 10W against a railing or other member with enough friction to slow down the forward speed in direction of arrow 13 and to retain temporarily the flow stream of pieces 10S, 10T, etc., therebehind, if necessary. Simultaneously jet 71 serves to produce an air jet vector in the direction of piece flow (13) to cause piece 10X to move faster. Thus, the gaps 30 are created in the flow path.

Figure 3:
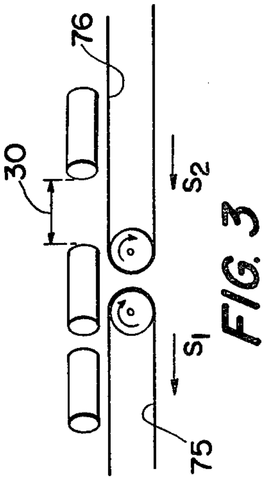
FIGS. 3 and 4 are alternative embodiments of equipment using the principles of the invention respectively for creating gaps between pieces flowing along a stream and for operating batching equipment by sensing gaps produced in the flow stream between pieces in successive batches.

The embodiment of FIG. 1 is desirable since the stream piece flow speed (except for temporary delays of jet 70 which are sometimes possible and acceleration by jet 71) remains at one constant speed optomized for maximum batching speed in synchronism with the batcher 16, etc. However, alternative separation means such as the two conveyor belts 75, 76 of FIG. 3 may be used to provide gapping 30 if the system tolerates a higher speed piece flow rate effected by the speed $S_2$ of belt 76 which is higher than that $S_1$ of belt 75.

Figure 2:
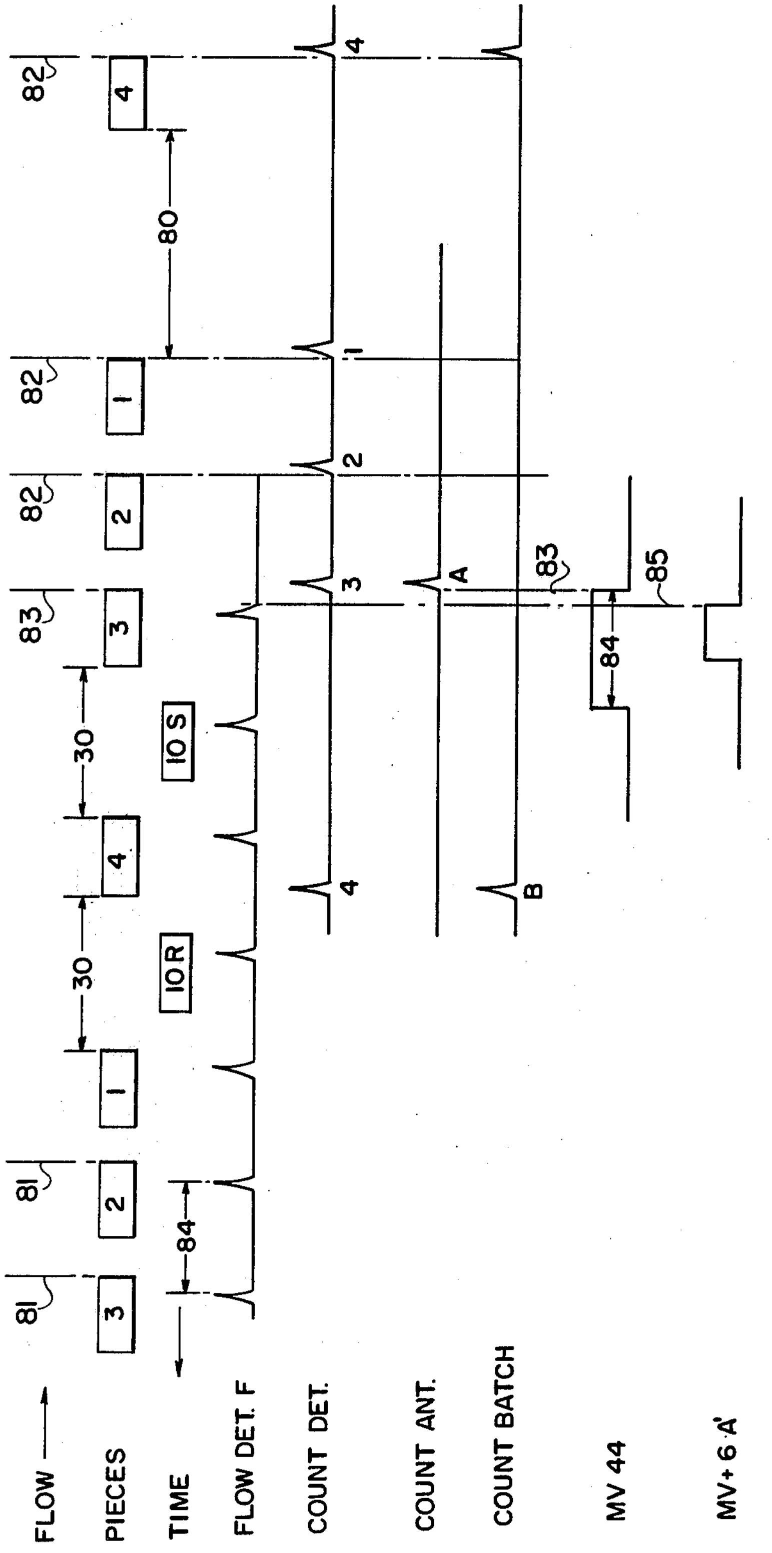
FIG. 2 is a flow chart showing typical wave form analysis of operational features of the invention.

Further understanding of the advantages, features and operational principles of this invention may be visualized from the wave chart diagram of FIG. 2. For perspective note the flow direction of pieces and thus the inverted time scale identified by appropriate arrow designation.

It may be seen that in the flow path on the left end the pieces are not separated by the larger gaps 80 hereinbefore described, as occurs on the right end. Note that by operation of the acceleration jet 71 a larger gap 80 accordingly appears between batches in the vicinity of the batcher mechanism where piece 10R has been removed. The same spacing occurs before the last batch piece in anticipation of the batch end where piece 10S is removed.

For purposes of illustration the batch count 4 is used an pieces numbered 1, 2, 3, 4 for identification of successive batches flowing to the right in the stream of pieces.

Also the periodically repetitive flow pulses are derived from the spacings at the left end of pieces as identified by phantom lines 81. Similarly the counter count pulses 1, 2, 3 and 4 are derived from the spacing of pieces at the right end as indicated by phantom lines 82. The anticipatory pulse A is then derived at count 3, and the batch count B at count 4.

It may be seen that multivibrator 44 is triggered by anticipatory count A at time 83 and has a duration 84 substantially identical with the spacing between two adjacent flow pulses F so that it will coincide with flow pulse time 85 and generate the jet pulse A', of appropriate width less than 84 to perform its function on one piece in the flow stream without overlap into presentation of the next pulse.

From the foregoing description of the novel features of this invention it is clear that the art is advanced unexpectedly with simpler equipment while attaining more reliability and higher processing speeds in batching systems which process batches of pieces flowing along a conveyance path. Accordingly, those features of novelty believed representative of the nature and spirit of the invention are defined with particularity in the appended claims.

What is claimed is:

1. Apparatus for conveying a continuously moving stream of pieces along a flow line at different effective selectable flow speeds providing a corresponding piece flow repetition rate, comprising in combination, conveying means aligning and moving the pieces to flow consecutively along said line at a substantially constant speed, flow control means disposed alongside said line selectively operable to form a gap by removing at least one of the pieces from said stream while flowing along the line to change the flow repetition rate at a designated cycle, and means processing pieces flowing along the line by mechanical handling equipment synchronized to perform an operation at the appearance of said gap.

2. Apparatus defined in claim 1 including a storage bin holding a plurality of pieces to be moved along said line feeding said conveying means, a ramp communicating directly with the storage bin comprising said flow line and having a width adapted to retain a single line of said pieces successively flowing thereon and positioned to permit pieces to fall off the ramp into said storage bin, wherein said flow control means pushes the pieces off said ramp into said bin.

3. Apparatus defined in claim 1 including counter means counting the pieces flowing along said line to signify a predetermined count of successive pieces, wherein said flow control means is selectively actuated from the counting means at a count in the order the said predetermined count.

4. Apparatus defined in claim 3 including means actuating the flow control means at a count less than that of said predetermined count.

5. Apparatus as defined in claim 1 including batching means for handling batches of said pieces, and said separation means selectively operable to separate pieces from flow along said line in batches for processing by said batching means.

6. Apparatus as defined in claim 1 having means producing a gap between pieces flowing along said line operative on successive ones of said pieces at a position along said line where a first piece leads a second lagging piece including accelerating means to accelerate the lead piece and braking means to brake the lagging piece.

7. Apparatus as defined in claim 6 wherein the accelerating means comprises a pulsed air jet timed to propel the lead piece faster along said line.

8. Apparatus as defined in claim 6 wherein the ramp has a surface against which the pieces flow along said line and said braking means comprises an air jet pushing said lagging piece against said surface to induce friction between the piece and surface.

9. Apparatus as defined in claim 1 wherein the flow control means comprises a plurality of spaced air jets to register with separate pieces along said line and means pulsating air flow thereout at such timing to impact and separate the pieces out of the flow line.

10. Apparatus as defined in claim 1 including detection means responsive to said flow of pieces operable at times coinciding with the gaps in the stream of pieces where the pieces are removed thereby to initiate a batching operation.

11. Apparatus as defined in claim 10 wherein said apparatus includes batching operation means separating batches of said pieces from said line having an exact piece count identified by said gap.

12. Apparatus as defined in claim 1 including means to increase spacing between two adjacent pieces flowing along said line.

13. Apparatus as defined in claim 1 wherein said flow control means removes at least two pieces separated by an interspersed piece.

14. Apparatus for separating pieces moving along a conveyor line at a known conveyance speed with substantially equal spacings between pieces into batches of a known piece count, comprising, means selectively removing from said line between batch counts of pieces passing along the line at least one piece to identify the batches by an increased spacing between successive pieces along said line, batching means for handling batches of said pieces, a detector responsive to detect the successive batches, and means responsive during said increased spacing between pieces flowing along the conveyor line operable to separate successive batches for handling by said batching means thereby increasing count accuracy without miscounts.

15. The method of increasing processing speed of batching counters operable from a flow of pieces along a conveying line terminating in batching separator equipment, comprising the steps of, maintaining the flow speed of pieces along said conveying line, removing selected pieces from said line at a position before the flow of pieces reach said batching equipment to identify successive batches by a detectable different spacing gap between adjacent pieces, and operating said batching equipment synchronously with the gaps between successive batches to process individual batches.

16. Batch apparatus for precisely counting out an exact predetermined number of pieces flowing along a line of moving pieces wherein the average repetition flow rate of the pieces is increased by conveying a continuously moving stream of pieces to a periodically operable batcher at a predetermined speed higher than the speed batcher can handle, comprising in combination, a piece counter counting pieces flowing along said stream, and means responsive to the piece counter selectively removing pieces from the line while they are flowing before they reach the batching apparatus to decrease the repetition rate of flowing pieces and provide a time gap between pieces, and means operating the batcher during the time gap to remove batches of pieces from the line thereby effectively reducing the flow rate only during batcher operation times while maintaining the average flow speed of the pieces at an optimum level.

17. Batching apparatus for counting out batches of pieces flowing along a stream of continuously moving pieces including batch separating means receiving a counted number of pieces from said stream, means producing a greater gap separation between pieces of two successive batches in said stream at a position before the stream enters said batch separating means and means operable during said gap actuating said batch separating means.

* * * * *